United States Patent
Brandt et al.

[11] 3,856,378
[45] Dec. 24, 1974

[54] METHOD AND MEANS FOR MODULATING LIGHT PROPAGATING IN AN OPTICAL WAVEGUIDE BY BULK ACOUSTIC WAVES

[75] Inventors: Gerald B. Brandt; Milton Gottlieb, both of Pittsburgh, Pa.

[73] Assignee: Westinghouse Electric Corporation, Pittsburgh, Pa.

[22] Filed: Feb. 28, 1973

[21] Appl. No.: 336,864

[52] U.S. Cl. .......................... 350/96 WG, 350/161
[51] Int. Cl. ........................... G02b 5/14, G02f 1/24
[58] Field of Search .............. 350/96 WG, 149, 161

[56] References Cited
UNITED STATES PATENTS

| | | |
|---|---|---|
| 3,208,342 | 9/1965 | Nethercot.............. 350/96 WG UX |
| 3,562,414 | 2/1971 | Blum........................ 350/149 UX |
| 3,619,796 | 11/1971 | Seidel.................. 350/96 WG UX |
| 3,655,261 | 4/1972 | Chang.................. 350/96 WG X |

*Primary Examiner*—John K. Corbin
*Attorney, Agent, or Firm*—D. Schron

[57] ABSTRACT

A method and means for modulating light propagating in an optical waveguide by passing ultrasonic acoustic waves, either longitudinal or shear bulk waves, through said optical waveguide. Also disclosed is a method and means for coupling light between at least two optical waveguides separated by a thin film having a lower index of refraction than said guides by passage of bulk acoustic waves through both of the guides.

11 Claims, 4 Drawing Figures

PATENTED DEC 24 1974          3,856,378

METHOD AND MEANS FOR MODULATING LIGHT PROPAGATING IN AN OPTICAL WAVEGUIDE BY BULK ACOUSTIC WAVES

FIELD OF THE INVENTION

The present invention relates to a method and means for acoustical-optical interaction, and, in particular, to integrated optical modulators and couplers utilizing bulk acoustical waves.

BACKGROUND OF THE INVENTION

While the underlying physical phenomena have been known for many years, thin film optical waveguides are of recent origin. Optical waveguides, particularly integrated optics—a plurality of optical components on a monolithic structure—offer major promise in signal processing and communication. Since microwave communication offers greater communication and signal processing capabilities over radio frequencies because of its wider modulation bandwidth, it has been widely believed that optical signal processing would be many times better than microwaves because of its even greater potential modulation bandwidth. The optical wavelength is about $10^4$ times smaller than microwaves, thereby permitting thin film optical devices to be placed adjacent each other on a single substrate making the device not only more economical but also less susceptible to environmental influences such as temperature changes, vibrations and stray electromagnetic radiation. Notwithstanding the potential of optical communications and signal processing, no efficient, economic and reliable methods of modulating light to take advantage of the wide bandwidths have been devised.

Briefly, thin film or waveguide optical systems comprise dielectric or semiconductor films deposited on a substrate. When a light beam is coupled into the film, the beam adapts itself so that it is confined within the thickness of the film. Within the plane of the film, the light wave is allowed to propagate in any direction and can be reflected or refracted at any given boundary. The wavelength of the guided wave, and therefore its propagation constant, is a function of the dimensions and indices of refraction of the guide and adjacent materials. In order for propagation to occur within a guide, the index of refraction for the guide material must be greater than the indices of refraction of the media bounding said guide. Furthermore, the continuity of the wave and its spatial derivatives at the boundary surfaces of the guide control the allowed wavelengths in the guide as well as the evanescent wave region where the wave exponentially decreases in amplitude. Since the decay constants of the beam in the evanescent regions (in the bounding media) are a function of the refractive indices of the bounding media, the guide is considered asymmetric where the index for each of the bounding media is different and symmetric where each is the same. Propagation cutoff in an asymmetrical guide for a given mode occurs when the functions in the guide and boundary media cannot be matched; as thickness of the guide decreases, cutoff thickness is reached. In a symmetrical guide, the lowest order beam mode has no cutoff.

Because of the small size of optical waveguides, direct coupling, such as by focusing optical energy, e.g. a laser beam, is not efficient. Successful coupling methods generally utilize coupling from the evanescent wave of a structure, normally a prism or grating. With a prism, for example, the light which is to be coupled into the guide is totally internally reflected from the prism having a higher index of refraction than the guide. In practice, the prism must be spaced apart from the guide so as to provide a thin gap of low refractive index in which an evanescent field is formed which couples energy into the guide.

A number of devices have been demonstrated in which the phase of the propagating light can be modulated. For example, a digital electro-optical deflector has been constructed in which periodic electrode patterns are used to generate voltage-controlled phase gratings in an electro-optic waveguide. Acousto-optic effects have also been demonstrated as capable of performing modulation and deflection. These devices take advantage of surface acoustic wave interaction in a two dimensional plane. In another type of device, a surface acoustic wave may interact with a light wave propagating collinearly with it; in this case, the light wave undergoes a mode conversion in which momentum is conserved. Thus, by utilizing radio or microwave frequency surface waves, a mode converter can be fabricated.

While mode conversion, phase modulation and deflection are useful advances in optical signal processing and communication, it is desirable to have both efficient and wide bandwidth modulations. Accordingly, it is an object of the present invention to provide a method and means for obtaining not only phase modulation and mode conversion, but also amplitude modulation of a propagating light beam within a waveguide. It is a further object of the present invention to provide a means and method for multichannel coupling.

SUMMARY OF THE INVENTION

The present invention provides a method and means for wide bandwidth modulation of propagated light waves in an optical waveguide. It has been found that ultrasonic waves, either shear or longitudinal bulk waves, traveling through an optical waveguide perpendicular to the plane of the waveguide and, thus, perpendicular to the direction of travel of the guided light can be made to modulate the guided light.

It has been found that as acoustical energy, in the form of either shear or longitudinal bulk waves, is applied to an optical waveguide, the amount of light in the incident beam is decreased and the modulated light is deflected into regions on either side of the undeflected light, i.e. to positions in the plane of the optically guiding film or waveguide. The deflected light is frequency shifted by the acoustical frequency with 180° phase shift between opposite orders and for both shear and longitudinal acoustic waves the polarization of the deflected light is unchanged from that of the incident light. In addition, shear waves mode convert a substantial portion of the guided light. The converted frequency shifted light subsequently propagates through the guide collinearly with the unconverted light. Accordingly, by utilizing shear acoustic waves, both modulation and mode conversion between TE and TM modes can be achieved. All of the light propagating through the waveguide is modulated at the acoustic frequency.

Generally, the means for acousto-optic interaction comprises an ultrasonic transducer bonded to the surface of an optical waveguide. The transducer may be bonded either directly or indirectly to the guide surface. An indirect bond may be achieved with an acoustical delay means, such as fused silica, which is positioned between the guide and the transducer. In both cases, the bond between the waveguide and the acoustic device must be made with a cement having a lower index of refraction than that of the guide to prevent the optical wave from being coupled out of the guide.

The most useful configuration for high frequency, wide band modulation is the deposition of thin film transducers, such as zinc oxide, directly on the waveguide by sputtering techniques. A thin layer of low refractive index serves to insulate the transducer electrode from the guided light. Further, if the waveguide material is piezoelectric, only electrodes are needed to produce the acoustic waves.

In another embodiment, an ultrasonic transducer is bonded to the surface of a waveguide means which comprises a plurality of stacked optical waveguides. By controlling the frequency or nature, longitudinal or shear, of acoustical bulk waves, light can be controllably coupled between various guides or may otherwise be modulated.

Other advantages of the invention will become apparent from a perusal of the following detailed description taken in connection with the accompanying drawings.

PRESENTLY PREFERRED EMBODIMENT

Figure 1:
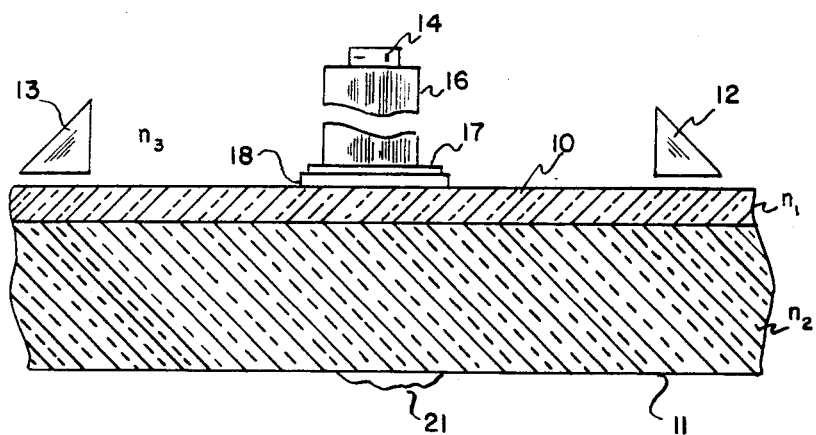
FIG. 1 is an elevation in partial section of an optical waveguide and ultrasonic transducer.

Referring to FIG. 1, the present invention comprises an optical waveguide 10 for propagation of light in the desired range of the spectrum, such as in the visible, infrared, and the like, and a substrate 11 upon which the guide is mounted. Waveguide 10 is preferably a sputtered glass such as Corning 7059 sputtered directly onto the substrate with a thickness of about one wavelength of the desired light or typically about $1.0\mu$ to $8.0\mu$. A thickness greater than a wavelength permits propagation in multiple modes, but a thickness greater than from about 10 to 20 wavelengths is typically no longer defined as a thin film waveguide. Alternatively, waveguide 10 may comprise polymeric films such as polyurethane, polyester epoxy films and the like for propagation in the visible, and semiconductor material such as GaAs for propagation in the infrared. Preferably, the material from which the optical guide is fabricated has a low loss, preferably between 1.0 and 10.0 dB/cm.

Substrate 11, upon which waveguide 10 is fabricated, is preferably glass, for example, Pyrex, which has an index of refraction of $n_2 = 1.47$. Since waveguide 10 is required to have an index of refraction greater than its bounding media, a typical index of refraction is preferably about $n_1 = 1.56$ for sputtered glass. As shown in FIG. 1, air can comprise the other boundary medium and has an index $n_3 = 1$. Accordingly, $n_1 > n_2, n_3$.

A pair of prisms 12 and 13 are shown for coupling light into and out of waveguide 10, respectively. Typically, prisms 12 and 13 have refractive indices of about 1.74. Since light is coupled by means of evanescent coupling, prisms 12 and 13 are spaced apart from guide 10 by a distance of about $\lambda/4$ or about $0.15\mu$. In cases where bonding the prisms to the waveguide is deemed desirable, a bonding material having an index of refraction less than $n_1$ of the guide is required. Alternatively, a pair of grating couplers could be used instead of prisms 12 and 13.

Mounted to waveguide 10 is an ultrasonic transducer 14. As shown, transducer 14 is mounted to guide 10 through acoustic delay line 16, for example, fused silica, and an acoustical bonding material 17, such as Canada Balsam. If acoustical bonding material 17 is of a higher index of refraction than $n_1$ of guide 10, it is necessary to provide an optical insulator 18 between said bonding material and guide to prevent an optical cutoff. It has been found that sputtered teflon or barium fluoride is suitable for such purposes. Preferably, insulator 18 is about one wavelength in thickness.

Transducer 14 is utilized to produce acoustic bulk waves, either shear or longitudinal. The acoustical waves traveling through the guided film modulate the guided light. As the acoustic energy is applied, the amount of light in the directed beam is decreased, and the modulated light is deflected into the regions on either side of the undeflected light or is mode converted. This modulation is achieved by passage of acoustical waves through guide 10. If the acoustical pulse is long enough, however, reflection from the bottom surface of substrate 11 can occur creating standing waves which have peak amplitudes twice that of a single-pass wave. This effect can be enhanced by making substrate 11 thin or may be attenuated by positioning an acoustical absorber or impedance matched delay line 21 on the lower surface of substrate 11 to prevent reflection.

Figure 3:
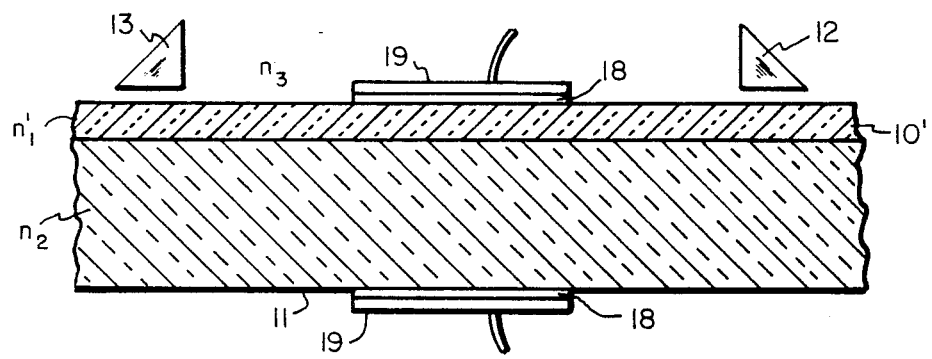
FIG. 3 is an elevation in partial section of an optical piezoelectric waveguide and electrodes for generating acoustical bulk waves in said waveguide.

With reference to FIG. 3 fabrication of the modulator of the present invention can be greatly simplified by utilizing as guide 10' high polymer materials which are also piezoelectric in nature. Suitable materials include polyvinyledene fluoride, polyvinyl fluoride, polycarbonate, polypropylene and the like. These materials exhibit piezoelectricity either as manufactured or following a heating and cooling cycle in a strong electric field. Since these materials are generally suitable as optical guide films, both acoustical generation and light guiding can be achieved in the same structure. With such a structure, it is only necessary to provide electrodes 19 on either side of the film or guide 10' separated therefrom by an optical insulator 18 to prevent light leakage. The acoustic resonance is determined by the film thickness and can be on the order of several hundred MHz.

Figure 2:
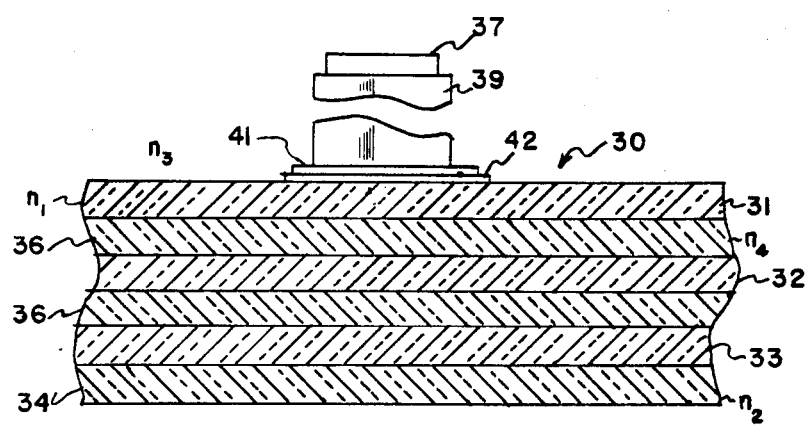
FIG. 2 is an elevation in partial section of an acousto-optical coupler for multichannel waveguides.
Figure 4:
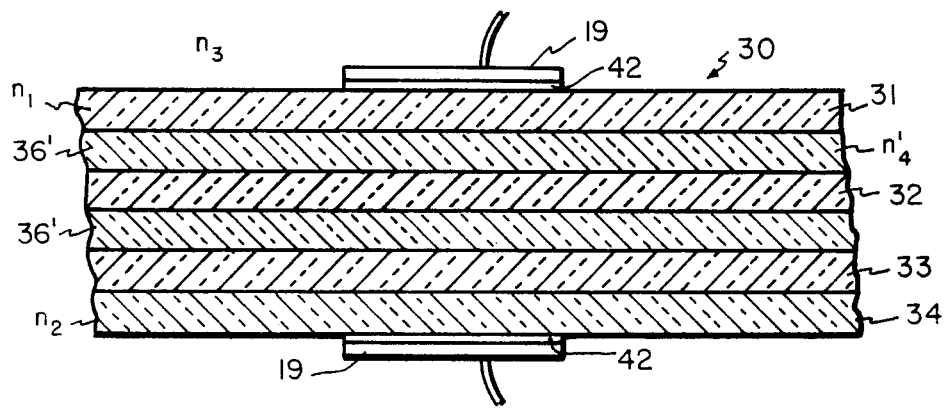
FIG. 4 is an elevation in partial section of an acousto-optical coupler for multichannel waveguides using piezoelectric separating films.

Referring to FIG. 2, a multichannel waveguide 30 is shown. Multichannel guide 30 is comprised of a number of stacked waveguides 31–33 mounted on substrate 34 and each separated by film 36 adapted for evanescent coupling by having an index of refraction less than that of the guides and by having a thickness sufficient to permit evanescent coupling of adjacent waveguides upon application of bulk acoustic waves. A transducer 37 is coupled to waveguide 31 through delay line 39, acoustical bond 41, and an optical insulator 42. Optical insulator 42 is preferably of a thickness greater than that of the evanescent region in the material or typically about 1 wavelength. Alternatively, greater selectivity between channels can be achieved by utilizing a film 36' having piezoelectric properties, as shown with reference to FIG. 4.

Acoustical waves produced by transducer 37 traveling through multichannel guide 30 provide a means for coupling light between the various guides. Accordingly, a directional coupling can be achieved, for example, by arranging the various layers to branch into separate directions in the waveguide plane after they leave the interaction region under the acoustic transducer.

While presently preferred embodiments of the invention have been shown and described in particularity, it may otherwise be embodied within the scope of the appended claims.

What is claimed is:

1. A method for modulating light propagated through an optical waveguide comprising:
   passing ultrasonic acoustic bulk waves through said waveguide substantially perpendicular to the plane of the waveguide and to the direction of light propagation for interaction with said propagated light.

2. A method as set forth in claim 1 wherein said acoustic waves are selected from the group consisting of longitudinal and shear bulk waves.

3. A method of coupling light between at least two waveguides separated by thin film of lower refractive index material, comprising:
   directing a beam of propagated light through at least one of said waveguides, and
   passing ultrasonic acoustic bulk waves through both of said waveguides substantially perpendicular to the plane of the waveguide and to the direction of light propagation to couple light into said other guide.

4. A method as set forth in claim 3 wherein said acoustic waves are selected from the group consisting of longitudinal and shear bulk waves.

5. An apparatus for modulating light comprising:
   a. an optical waveguide adapted to propagate light,
   b. an optical insulator mounted to a surface of said waveguide and having an index of refraction less than said waveguide, and
   c. an ultrasonic transducer mounted to said insulator and adapted to generate bulk acoustic waves substantially perpendicularly through said waveguide.

6. An apparatus as set forth in claim 5 wherein an acoustical delay line is interposed between said insulator and transducer.

7. An apparatus as set forth in claim 5 including an acoustical absorber mounted to the surface of said waveguide opposite from said transducer.

8. An apparatus for modulating light comprising an optical waveguide adapted to propagate light therethrough and being piezoelectric, and a pair of electrodes, said electrodes being mounted to opposite surfaces of said waveguide for generating bulk acoustic waves substantially perpendicularly through said waveguides and having interposed between each of said electrodes and said waveguide an optical insulator.

9. An apparatus for coupling light between at least two waveguides, said apparatus comprising at least two optical waveguides having at least planar portions located adjacent each other and having positioned between said adjacent portions thin film adapted to transmit evanescent waves therethrough upon application of acoustic energy and having an index of refraction less than said waveguide, and an acoustic transducer mounted to the surface of one of said waveguides for generating bulk acoustic waves substantially perpendicularly through said waveguides and including an optical insulator positioned between said guide and transducer.

10. An apparatus as set forth in claim 9 wherein said waveguide is piezoelectric.

11. An apparatus for coupling light between at least two waveguides comprising at least two waveguides having at least planar portions located adjacent each other and separated by a thin piezoelectric film and electrode means positioned adjacent each of said waveguides for generating bulk acoustic waves substantially perpendicularly through said waveguides by activating said piezoelectric film.

* * * * *